(12) United States Patent
Elms

(10) Patent No.: US 6,467,422 B1
(45) Date of Patent: Oct. 22, 2002

(54) HYDROFOIL DEVICE

(75) Inventor: Antony Richard Elms, Lower Templestowe (AU)

(73) Assignee: Elms Austrialia Pty Ltd., Lower Templestowe (AU)

( * ) Notice: Subject to any disclaimer, the term of this patent is extended or adjusted under 35 U.S.C. 154(b) by 0 days.

(21) Appl. No.: 09/674,734
(22) PCT Filed: May 6, 1998
(86) PCT No.: PCT/AU99/00333
§ 371 (c)(1), (2), (4) Date: Nov. 6, 2000
(87) PCT Pub. No.: WO99/57007
PCT Pub. Date: Nov. 11, 1999

(30) Foreign Application Priority Data
May 6, 1998 (AU) ............................................... PP3416

(51) Int. Cl.⁷ ................................................. B63B 1/24
(52) U.S. Cl. ...................................................... 114/274
(58) Field of Search ................................ 114/271, 274, 114/280; 244/211, 212, 213, 214, 215; 416/191, 228, 237

(56) References Cited

U.S. PATENT DOCUMENTS

| | | | | |
|---|---|---|---|---|
| 1,893,064 A | * | 1/1933 | Zaparka ...................... | 244/198 |
| 3,934,533 A | * | 1/1976 | Wainwright ................. | 114/274 |
| 3,977,348 A | * | 8/1976 | Bordat et al. ............... | 114/274 |
| 4,293,280 A | * | 10/1981 | Yim ............................. | 416/237 |
| 4,542,868 A | * | 9/1985 | Boyd ........................... | 244/198 |
| 4,865,520 A | * | 9/1989 | Hetzel et al. ............. | 416/236 R |
| 5,046,444 A | * | 9/1991 | Vorus ........................... | 114/274 |
| 5,058,837 A | * | 10/1991 | Wheeler ...................... | 244/199 |
| 5,309,859 A | * | 5/1994 | Miller ......................... | 114/274 |
| 5,366,176 A | * | 11/1994 | Loewy et al. ............. | 244/75 R |
| 5,492,448 A | * | 2/1996 | Perry et al. .................... | 416/62 |
| 5,551,369 A | * | 9/1996 | Shen .......................... | 114/274 |

FOREIGN PATENT DOCUMENTS

| | | | |
|---|---|---|---|
| GB | 352833 | * | 7/1931 |
| JP | 3-292286 A | | 12/1991 |
| WO | WO 96/20105 | | 7/1996 |

* cited by examiner

Primary Examiner—S. Joseph Morano
Assistant Examiner—Lars A. Olson
(74) Attorney, Agent, or Firm—Blank Rome Comisky & McCauley LLP

(57) ABSTRACT

A hydrofoil device is useable as a hydrofoil wing, propeller blade, etc. In a water flow, a relatively lower pressure is generated on a second surface (94) of the device compared with a first surface (96). Near the trailing end of the first surface a protrusion in the form of an adjustable interceptor (98) is provided. The face of this protrusion defines an included angle to the upstream direction of less than or equal to 90° so that water flow thereat is deflected back on itself thereby increasing the local pressure on the first surface. A second protrusion may be provided near the leading edge of the second surface (94) to encourage flow separation thereat. Air may be provided adjacent each protrusion to provide natural ventilation if the pressure of the water flow drops below atmospheric pressure.

27 Claims, 7 Drawing Sheets

HYDROFOIL DEVICE

FIELD OF THE INVENTION

The present invention relates to an improved hydrofoil device whereby lift is generated primarily from a local pressure increase above that of the local free stream or ambient pressure. It relates particularly, although not exclusively, to improved hydrofoil devices with marine applications such as hydrofoil wings, propeller blades and control surfaces such as rudders and hydroplanes.

BACKGROUND TO THE INVENTION

The term "hydrofoil" as employed throughout the specification is used to describe a physical structure used to generate lift when passed through water in much the same way the word "aerofoil" is used to describe a similar structure when employed in air. Hydrofoils may be used for dynamic support as for a wing, for a control surface such as a rudder, for propulsion as for a screw propeller and in pumps and water turbine machinery. The principles of operation of hydrofoils are however similar in each application.

Like aerofoils, hydrofoils generate lift by changing the velocity of the fluid around the surface. A change in the velocity distribution over the hydrofoil is associated with a pressure change over the surface of the hydrofoil. It is this pressure distribution, that when integrated over the surface of the hydrofoil results in force. The integral of pressure over the surface of the hydrofoil resolved normal to the flow is the lift force of the hydrofoil and the integral of pressure resolved in the direction of flow is the drag. The ratio of lift to drag is a measure of the hydrofoil's efficiency. The lift vector may be aligned in any direction according to the application. It may be upward, downward, horizontal or at some other orientation. For convenience of further description the lift vector will normally be assumed to be upward.

For conventional hydrofoil sections as used for most ships' propellers the acceleration of the fluid around the hydrofoil implies an associated reduction in pressure. It is hence the reduction in pressure over the hydrofoil that contributes most to lift.

The limit in the application of such devices to high inflow velocities lies in the magnitude of the pressure reduction possible resulting from velocity increase. When the local pressure falls below the vapour pressure of the water, the water vaporises and a vapour pocket forms. The forming of such vapour pockets is often referred to as cavitation. Once the water vaporises, the pressure cannot be significantly reduced further and so this condition represents a lower limit of pressure and a hence a limit to the force capability of a hydrofoil.

The present invention relates to an improved hydrofoil device whereby lift is generated primarily from a local pressure increase. This approach represents a significant departure from conventional hydrofoil design where lift is primarily generated by means of pressure reduction, or suction. An object of the present invention is, amongst other benefits, to avoid the above mentioned limitation on force capability imposed by the onset of cavitation, thereby enabling application with high inflow velocities that would otherwise result in, or be limited in for by, cavitation. The device however remains effective at reduced inflow velocities.

It is generally known that a decrease in fluid velocity is accompanied by a pressure increase. This phenomenon is widely exploited in aviation in the form of a spoiler used to intercept the flow over a wing thereby reducing velocity and effecting a local pressure increase. The use of such a device is however accompanied by a flow separation and the formation of low pressure region behind the device. It is the pressure drag associated with this low pressure region that contributes to such devices poor efficiency.

The application of similar devices to the marine environment is further complicated by the possibility of multiple phase flows, namely liquid and gas While a pressure increase ahead of the device may be possible, the separated region formed behind the device may be of sufficiently low pressure to initiate cavitation.

Australian patent application No. AU 43617/96, which is the Australian National Phase of PCT/SE95/01582, describes a mechanism for dynamic trimming of the floating position of a planing or semi-planing ship hull so as to counteract the pitching and rolling movements in operation. The mechanism includes a plate that is mounted submerged transversely to the relative water flow and protrudes at the lower end of the stem of the ship hull for generating a vortex having an upwardly and forwardly directed velocity component in front of the plate. This vortex creates a water volume below the stem of the ship hull that has an increased pressured directed to the bottom surface of the hull and which therefore directly affects the trimming position of the ship at prescribed velocities. This mechanism is however limited in application to transom stem vessels where the region behind the transverse plate can be ventilated to minimise pressure drag.

The present invention was developed with a view to providing a means to exploit the benefits of a local pressure increase on a surface of a hydrofoil whilst reducing the detrimental influence of pressure drag.

SUMMARY OF THE INVENTION

Throughout this specification the term "comprising" is used inclusively, in the sense that there may be other features and/or steps included in the invention not expressly defined or comprehended in the features or the steps specifically defined or described. What such other features and/or steps will include will be apparent from the specification read as a whole.

According to one aspect of the present invention there is provided an improved hydrofoil device, the hydrofoil device comprising:

a first surface and a second surface located on an opposite side of the device to said first surface, wherein water flows over the first and second surfaces from a leading edge to a trailing edge of the device; and, a protrusion provided adjacent the trailing edge of the device so as to produce a surface discontinuity on said first surface wherein said protrusion is arranged with an included angle to the upstream direction of the blade of less than or equal to 90° whereby, in use, the flow of water over the surface is deflected back on itself, a resulting increase in the local pressure on said first surface ahead of said protrusion contributes substantially to the lift generated by the hydrofoil device.

Advantageously said protrusion is provided by means of an adjustable interceptor, said interceptor having a moveable surface forming said included angle whereby, in use, the extent to which said moveable surface protrudes from said first surface can be varied to control the degree of lift generated by the hydrofoil device. Preferably said moveable surface can be made to protrude from either one of said first surface or said second surface so as to change the direction of lift generated by the hydrofoil device.

Typically said hydrofoil device further comprises means for ventilating a separated cavity formed adjacent a trailing edge of the device bounded by the water flowing over said first and second surfaces. Preferably said means for ventilating comprises a flow path for air from atmosphere whereby, in use, air will be drawn into the cavity by natural ventilation.

In one embodiment said adjustable interceptor is formed by a trailing edge section of the hydrofoil device, said trailing edge section being pivotally mounted on a main body of the device by means of one or more pivot plates. Preferably each said pivot plate extends outwards to a maximum depth of said protrusion and extends upstream at least twice this distance. Typically each said pivot plate is pivotally coupled to the interior of said main body by a pivot pin. Advantageously one of said pivot plates is located at an end of a span of the hydrofoil device to prevent pressure loss at a tip of the device.

In another embodiment said adjustable interceptor is formed by a moveable section slidably mounted in guides so as to be moveable in a direction substantially perpendicular to the direction of flow of water around said hydrofoil device. Advantageously said guides are formed by guide plates fixed to a main body of the device and adapted to minimise spilling of the localised high pressure region across said first surface.

According to another aspect of the present invention there is provided an improved propeller for marine propulsion, the propeller having a plurality of hydrofoil blades, and at least one of the hydrofoil blades comprising:

a first surface and a second surface located on an opposite side of the blade to said first surface, wherein water flows over the first and second surfaces from a leading edge to a trailing edge of the blade; and, a protrusion provided adjacent the trailing edge of the blade so as to produce a surface discontinuity on said first surface and wherein said protrusion is arranged with an included angle to the upstream direction of the hydrofoil of less than or equal to 90° whereby, in use, as the flow of water over the surface is deflected back on itself, a resulting increase in the local pressure on said first surface ahead of said protrusion contributes substantially to the thrust generated by the propeller.

Preferably said protrusion is provided by means of an adjustable interceptor, said interceptor having a moveable surface forming an included angle to the upstream direction of the blade whereby, in use, the extent to which said moveable surface protrudes from said first surface can be varied to control the thrust generated by the propeller.

Preferably said moveable surface is formed on a slidable plate which is supported in diagonal guide slots oriented in a main body of the blade so that actuation from a hub of the propeller of said slidable plate is orthogonal to the direction of the blade movement.

Advantageously said hydrofoil device further comprises:
  a second protrusion provided adjacent the leading edge of the device so as to produce a surface discontinuity on said second surface whereby, in use, a resulting flow separation defined on said second surface reduces friction and contributes substantially to stable flow conditions across said second surface.

Preferably means for ventilating the second surface behind said second protrusion are provided so as to prevent reattachment of the separated flow and inhibit the possibility of cavitation on said second surface.

Preferably said second protrusion is adjustable between a first position in which a leading edge surface discontinuity is formed on said second surface and a second position on which a leading edge surface discontinuity is formed on said first surface.

Typically said second protrusion is formed by a leading edge portion of the hydrofoil device which is moveable between said first and second positions.

BRIEF DESCRIPTION OF THE DRAWINGS

In order to facilitate a more detailed comprehension of the nature of the invention several embodiments of the improved hydrofoil device will now be described in detail, by way of example only, with reference to the accompanying drawings, in which.

DETAILED DESCRIPTION OF PREFERRED EMBODIMENTS

Figure 1A:
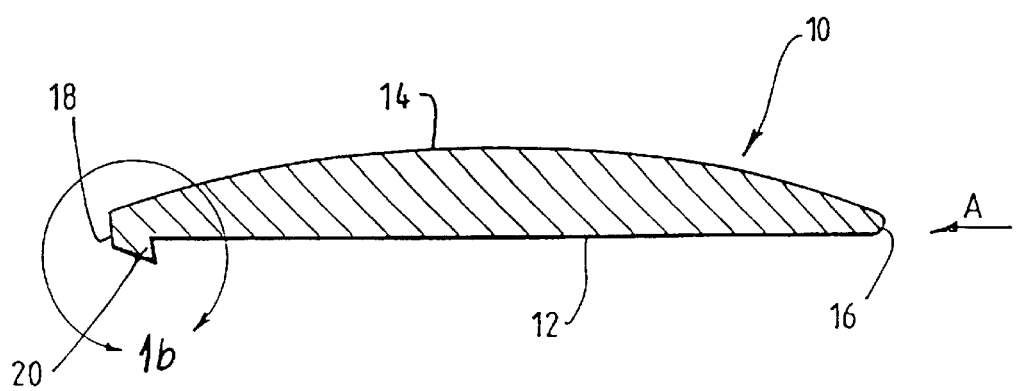
FIGS. 1(a) and (b) illustrate a first embodiment of a hydrofoil device according to the present invention.
Figure 1B:
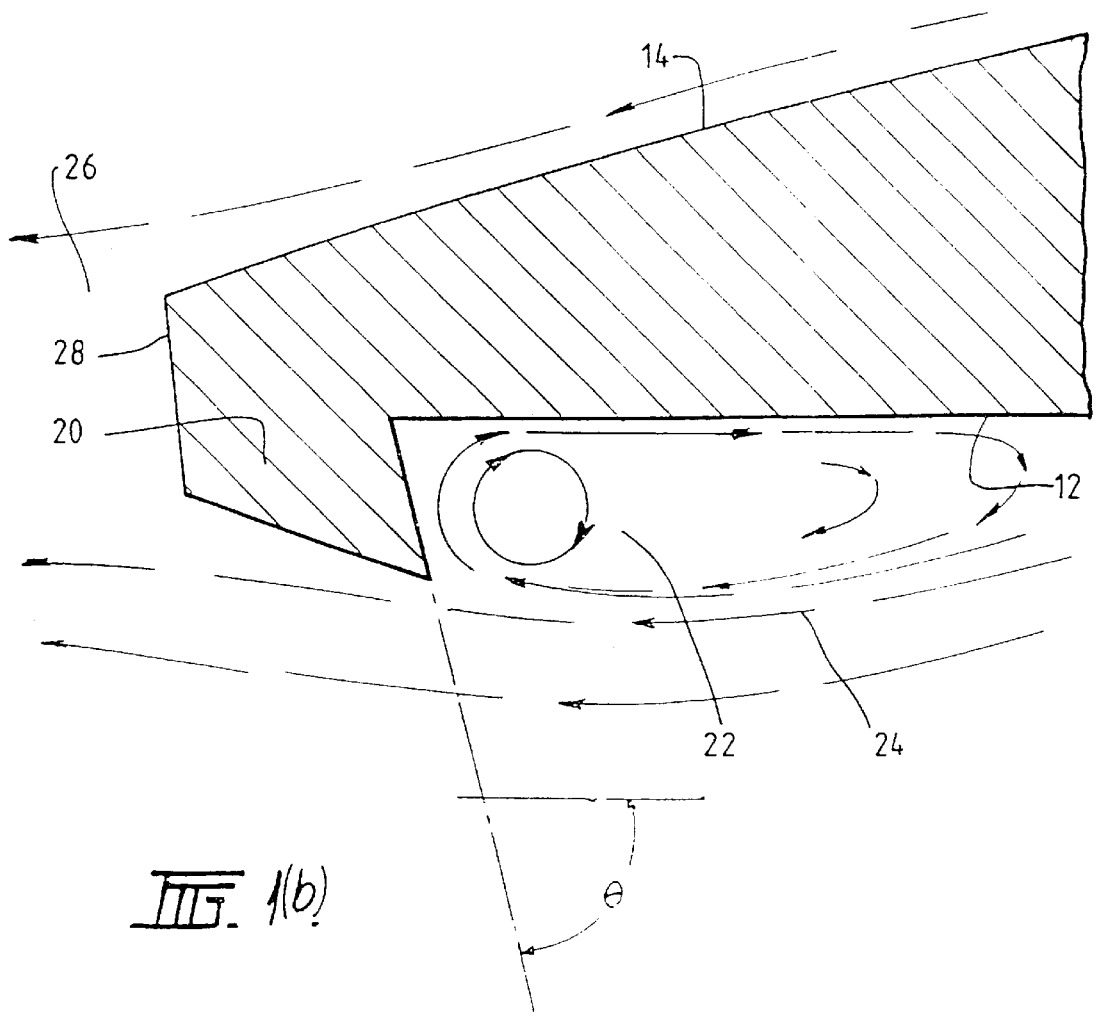

A first embodiment of the improved hydrofoil device 10 in accordance with the invention as illustrated in FIG. 1 comprises a first surface 12 generally subject to a higher than ambient local pressure. A second surface 14 is provided on the opposite side of the hydrofoil device and is generally subject to a local pressure relatively lower than that of the first surface 12 as water flows in the direction of arrow A over the first and second surfaces from a leading edge 16 to a trailing edge 18 of the device 10. A protrusion 20 is provided adjacent the trailing edge 18 so as to produce a surface discontinuity on the first surface 12. As can be seen more clearly in FIG. 1(b) the protrusion 20 is arranged with an included angle θ to the upstream direction of the hydrofoil of approximately 90° so that the flow of water over the first surface 12 is deflected back on itself. For this reason, the included angle θ is preferably slightly less than 90° so as to create a recirculating flow 22 in front of the protrusion 20. The recirculating flow 22 serves to decelerate the flow thereby increasing the local pressure on the first surface 12. It is this increase in local pressure that is of benefit in generating lift.

Near the first surface 12 a separating stream line 24 will exist, above which the flow will recirculate and below which the flow will be deflected by the recirculating flow 22. Upon being deflected, the flow below the separating streamline 24 will separate off a discontinuity. The flow will remain separated aft of the hydrofoil device 10 so as to form a separated cavity 26. An air source made available to the separated cavity 26 will minimise the pressure drag. As the separated cavity 26 without air will typically be at a pressure less than atmospheric pressure, air will be drawn into the cavity without power assistance. This is known as natural ventilation and relies on a suitable path being available for the air to reach the hydrofoil device 10 from the atmosphere. To assist the natural ventilation, a base vented hydrofoil section has been adopted. Base venting describes the blunt end face 28 of the trailing edge 18 that will encourage ventilation at all times thus maintaining a readily available air pathway.

As a result of the presence of the protrusion 20 on the lower surface, the local pressure on the first surface ahead of the protrusion 20 is increased above that of the local hydrostatic pressure. The extent of the influence on the pressure ahead of the protrusion 20 is a function of (among other things) the height of the protrusion 20. By varying the height of the protrusion above the first surface 12 the extent of the influence can be varied. FIG. 2 illustrates a second embodiment of a hydrofoil device according to the invention which incorporates an adjustable interceptor for varying the height of the protrusion.

Figure 2A:
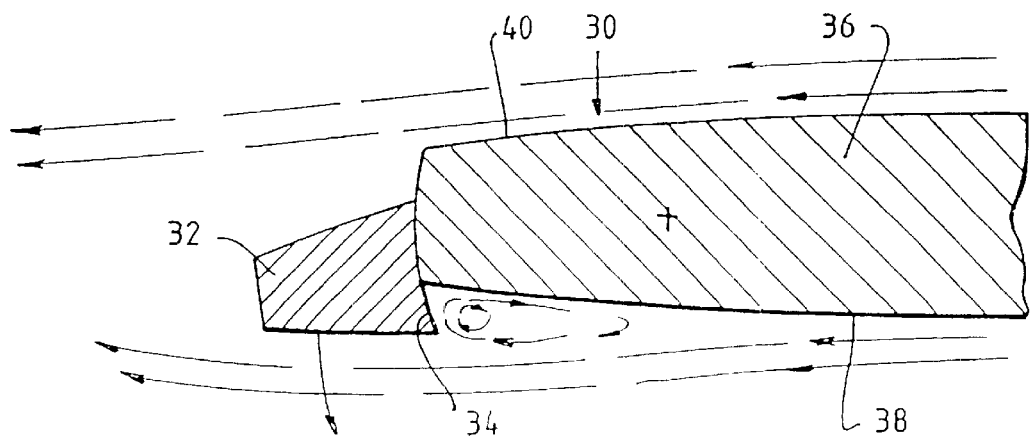
FIGS. 2(a), (b) and (c) illustrate a second embodiment of a hydrofoil device according to the present invention.

In the hydrofoil device 30 of FIG. 2, a trailing edge section 32 of the device forms an adjustable interceptor having a moveable surface 34. The trailing edge section 32 is pivotally mounted on a main body 36 of the device so that the extent to which the moveable surface 34 protrudes from a first surface 38 as shown in FIG. 2(a), can be varied. Moveable surface 34 forms an included angle to the upstream direction of the foil of slightly less than 90° so as to produce a recirculating flow and a resulting increase in local pressure on the first surface 38 ahead of the moveable surface 34. The integral of pressure over the entire surface of the section will provide the net force on the hydrofoil section. The force may be resolved into a first component in the direction of the flow called drag, and a second component normal to the flow called lift. With the described embodiment, the contribution to lift from the lower surface 38 over pressure (above hydrostatic pressure) is more significant than that from the upper surface, although there are contributions to lift from both surfaces. The greater the height of the perturbation on the lower surface 38 provided by the adjustable interceptor 32, the greater the lift generated.

Figure 2B:
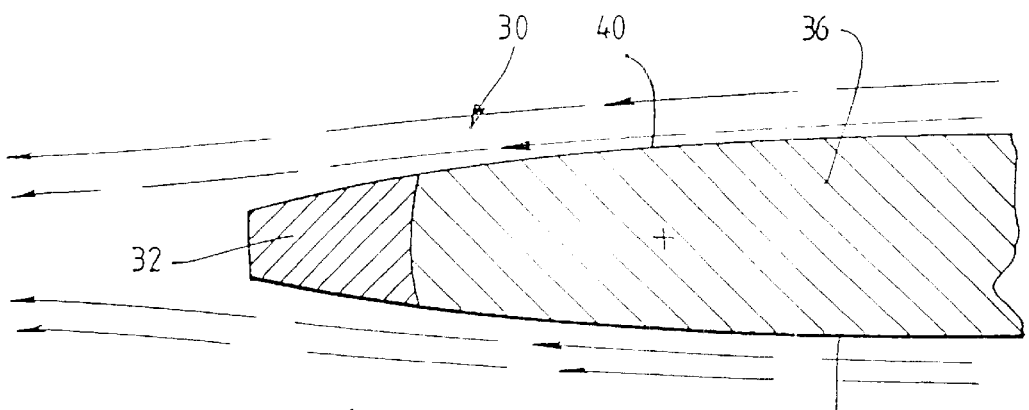
Figure 2C:
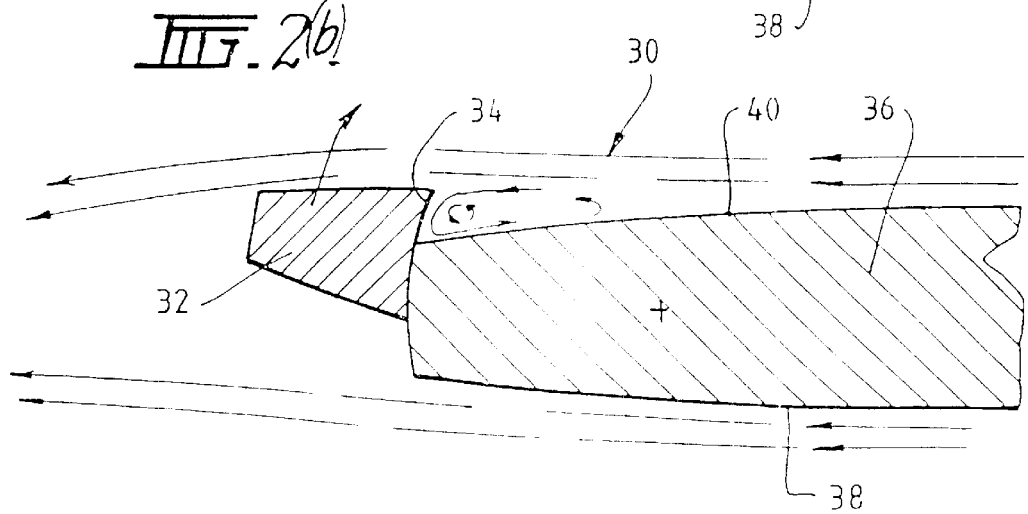

Advantageously the adjustable interceptor 32 can be pivoted either side of the hydrofoil device so as to extend the protrusion from either surface of the hydrofoil. FIG. 2(b) illustrates the trailing edge section 32 forming the adjustable interceptor in the neutral position, whereas FIG. 2(c) shows the adjustable interceptor 32 protruding above the upper surface of the hydrofoil. The increase in local pressure on the upper surface of the hydrofoil device 30 as shown in FIG. 2(c) would contribute to a net lift force acting on the section in a downwards direction. This principle may be applied to both symmetric and asymmetric foil sections.

Figure 3A:
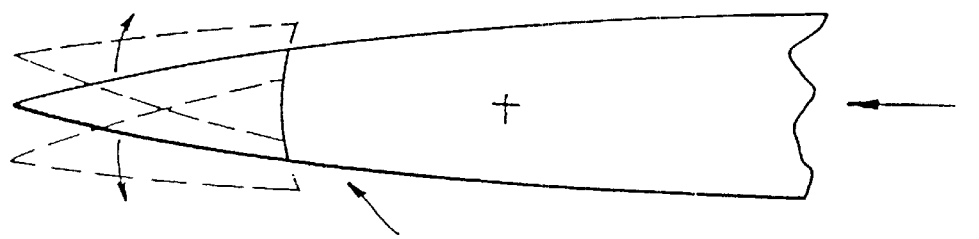
FIGS. 3(a) and (b) illustrate variations of the hydrofoil device of FIG. 2.
Figure 3B:
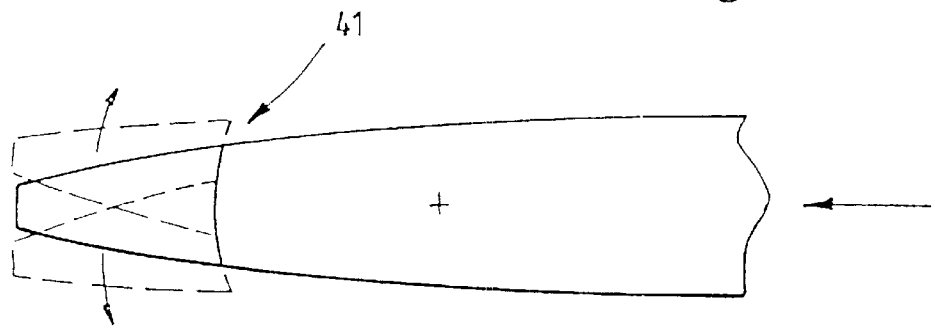

In applications where high lift is required for only a limited period of time, or where the hydrofoil device is to be operated for extended periods of time with low inflow velocities, the effect of the present invention may be combined with a conventional hydrofoil and a non-base vented foil 39 may be used as shown in FIG. 3(a). Like the base vented foil 41 illustrated in FIG. 3(b), an air source should preferably be made available to be most effective.

Any suitable mechanism for effecting movement of the adjustable interceptor may be employed. An important consideration is that the included angle at the discontinuity should not allow pressure loss through the mechanism. The lift generated by the hydrofoil device will diminish with increasing pressure loss through this location. Movement of the trailing edge section 32 of the device may be effected by a hydraulic actuator, mechanical linkage or a servo control surface. Any such driving device can be operatively connected to an electronic controller of appropriate type to regulate the lift generated for the particular application. It is in such active control applications that the device will demonstrate rapid lift variations due to adjustment of the discontinuity. The low driving power required and the rapid response time make this device more effective than incidence control of a conventional hydrofoil.

Figure 4A:
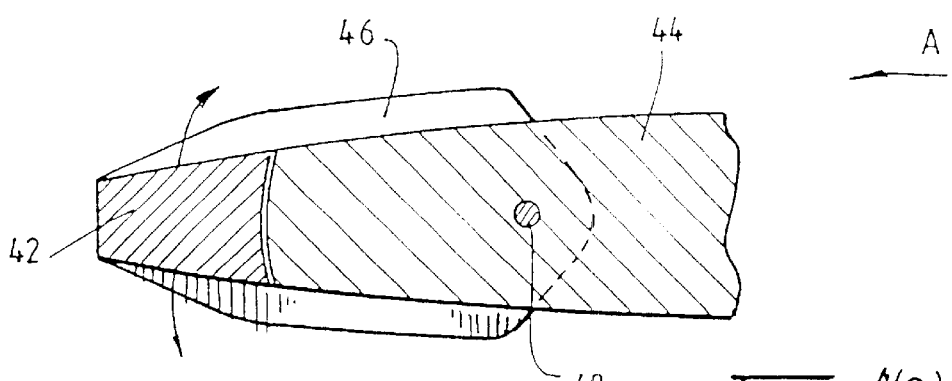
FIGS. 4(a) and (b) illustrate one possible mechanical arrangement for providing an adjustable interceptor for the hydrofoil device of FIGS. 2 and 3.
Figure 4B:
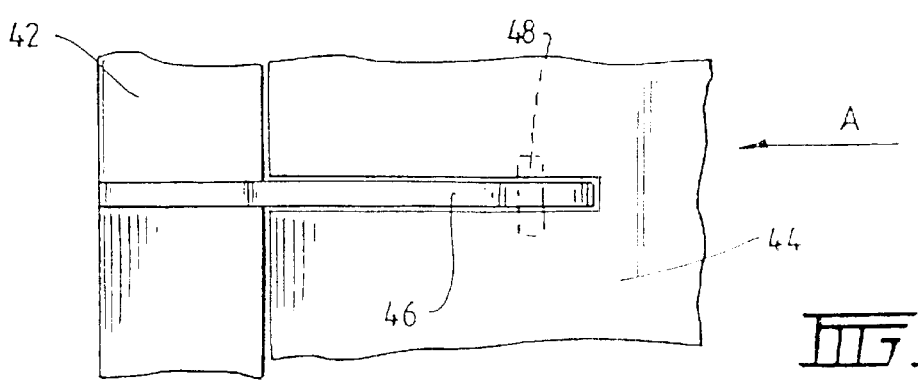
Figure 5A:
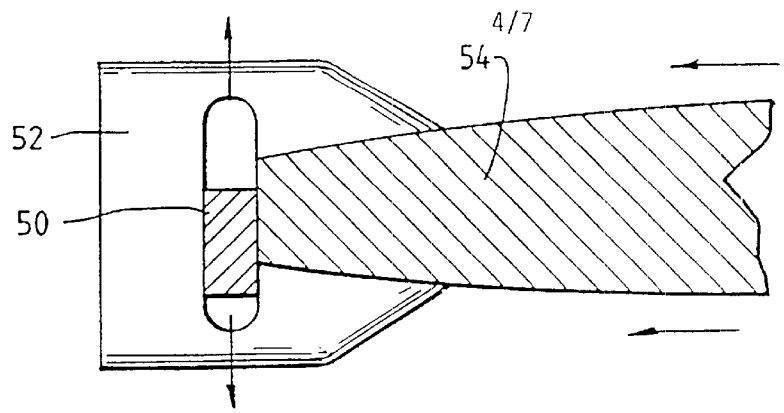
FIGS. 5(a) and (b) illustrate another possible mechanical arrangement for providing an adjustable interceptor for the hydrofoil device of FIGS. 2 and 3.
Figure 5B:
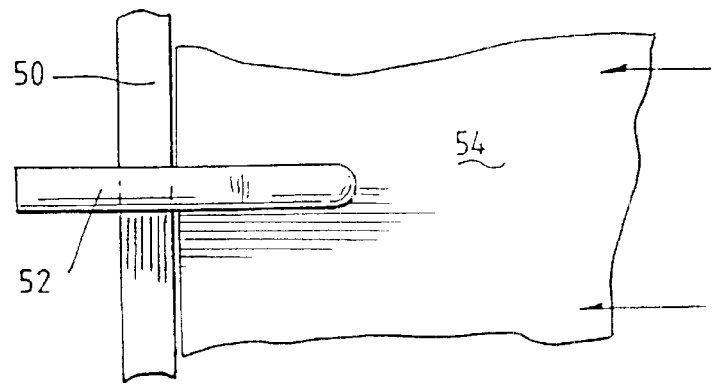

Two possible mechanical arrangements for effecting movement of an adjustable interceptor are illustrated in FIGS. 4 and 5. In 4(a) the adjustable interceptor is formed by a trailing edge section 42 which is pivotally mounted on a main body 44 of the hydrofoil device by means of a pivot plate 46. Pivot plate 46 is pivoted from the interior of the main body 44 by a pivot pin 48. Typically, two or more of such pivot plates 46 are provided for supporting the adjustable interceptor 42. The presence of the plates 46 serves not only to support the trailing edge section 42 of the hydrofoil, but also provides a means of trapping the localised high pressure region and preventing it spilling across the surface of the foil. Advantageously the pivot plates 46 are sized so that they extend at least to the depth of the protrusion and at least twice this distance upstream.

A plate should also be located at least at the end of the hydrofoil span to prevent pressure loss at the tip.

FIG. 5 illustrates a sliding arrangement in which the adjustable interceptor is formed by a moveable section 50 which is slidably mounted in guides similar to a guillotine. In this embodiment the guides are formed by guide plates 52 fixed to a main body 54 of the hydrofoil device. In this arrangement, the guide plates 52 also help to minimise spilling of the localised high pressure region across the surface of the hydrofoil. The sizing and location of the guide plates 52 would be dictated by similar considerations to that of the pivot plates 46 of FIG. 4.

Figure 6A:
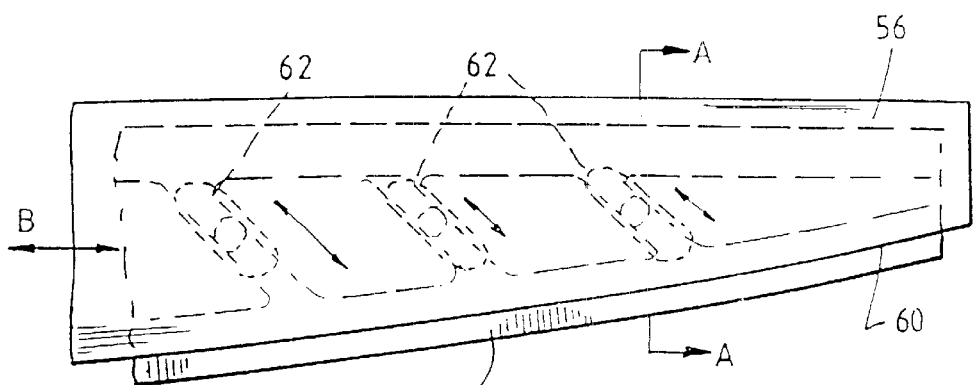
FIGS. 6(a) and (b) illustrate a possible mechanical arrangement for providing an adjustable interceptor for a hydrofoil blade of a propeller, FIG. 6(b) being a section view through the line A—A in FIG. 6(a)
Figure 6B:
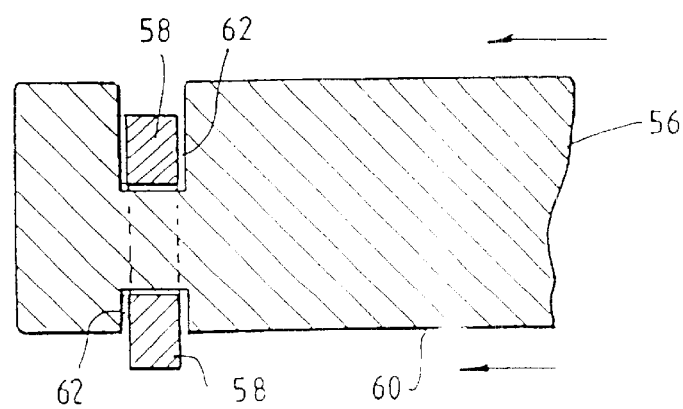

In the application of the present invention to a propeller blade, the actuation of the adjustable interceptor would normally be available from a hub of the propeller. FIG. 6 illustrates an appropriate arrangement for propeller actuation. FIG. 6(a) illustrates a blade 56 of a propeller viewed end on from the trailing edge, with an adjustable interceptor 58 protruding from a first surface 60 thereof. As in the previous embodiments, the protrusion provided by the adjustable interceptor is provided adjacent the trailing edge of the propeller blade 56 so as to produce a surface discontinuity on the first surface 60. In use, a resulting increase in the local pressure on the first surface 60 of the blade contributes substantially to the thrust generated by the propeller. This contrasts with conventional propeller design in which most of the thrust is generated by suction on the low pressure side of the propeller blades. As can be seen more clearly in FIG. 6(b) the adjustable interceptor is formed by a slidable plate which is supported in diagonal guide slots 62 oriented in a main body of the blade 56 so that actuation in the direction of arrow B from the hub of the propeller of the slidable plate 58 is orthogonal to the direction of the blade movement. The interceptor plate 58 slides in the direction of arrow C.

Figure 7A:
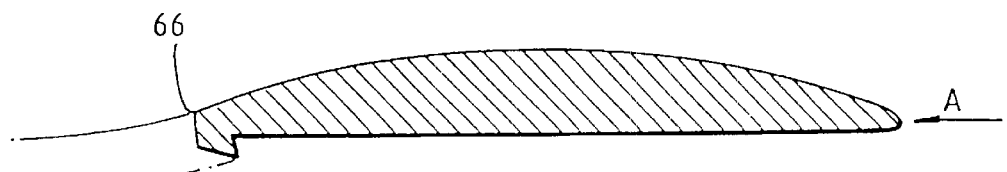
FIGS. 7(a) and (b) illustrate the formation of separated flow on a surface of the hydrofoil device of FIG. 1.
Figure 7B:
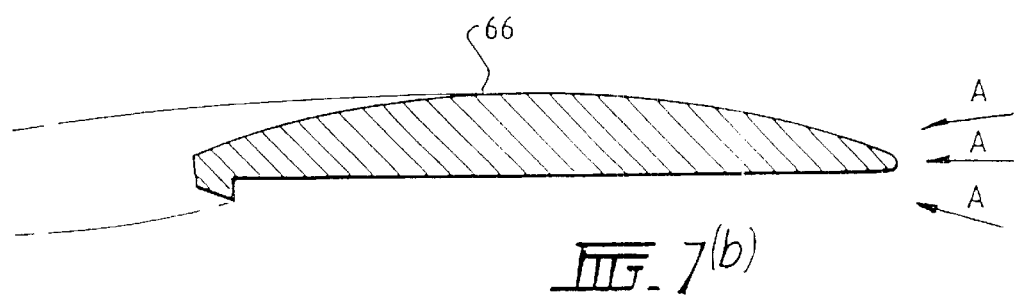

Each of the embodiments of the hydrofoil device illustrated in FIGS. 1 to 6 is best suited to conditions of steady inflow. Where fluctuations in the inflow velocity exist due to instability in the flow, there is a risk of uncontrolled ventilation as illustrated in FIG. 7. Due to changes in the inflow velocity, there may exist a region of low pressure on the upper surface of the hydrofoil (the surface on the opposite side to the protrusion). In this situation, it is possible that the base vented air cavity may extend forward as shown in FIG. 7(b) to equalise the pressure. Since there would no longer be a defined separation point at the leading edge of the cavity, unstable flow conditions would result and the lift force would fluctuate as the separation point 66 oscillates along the upper surface of the hydrofoil. The localised high pressure region on the lower surface ahead of the protrusion will suppress any ventilation on the lower surface of the hydrofoil. While FIG. 7 illustrates such instability on a hydrofoil design for lift in one direction only, a similar phenomenon could occur on either side of a hydrofoil designed to lift in both directions such as that in FIG. 2. A hydrofoil operating in waves may be subject to such oscillations. To extend the application of the invention to operate successfully in oscillating inflow conditions, a further discontinuity may be provided on the upper surface of the hydrofoil.

Figure 8A:
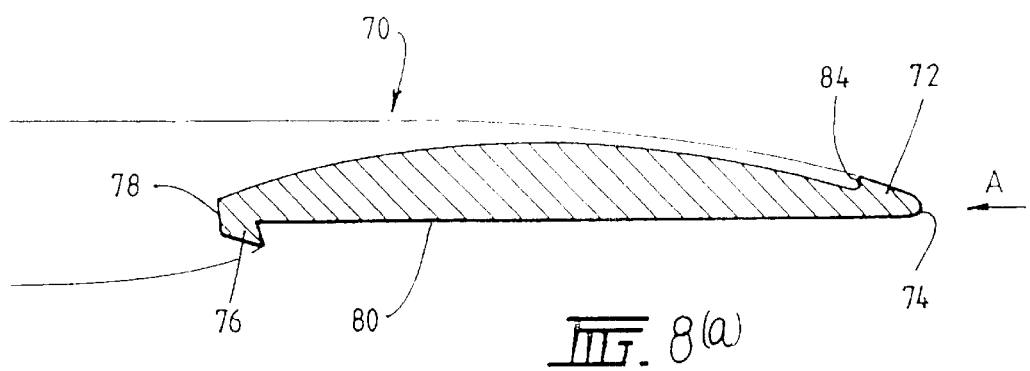
FIGS. 8(a) and (b) illustrate a third embodiment of a hydrofoil device according to the present invention.
Figure 8B:
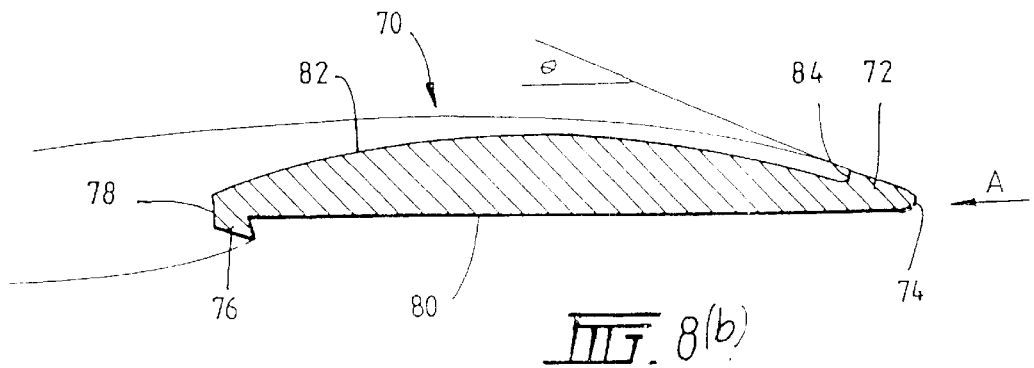

FIG. 8 illustrates a third embodiment of a hydrofoil device 70 in accordance with the present invention. The hydrofoil device 70 of FIG. 8 is similar to that illustrated in FIG. 1 except that it further comprises a second protrusion 72 provided adjacent to a leading edge 74 of the device. The device 70 also has a first protrusion 76 provided adjacent a trailing edge 78 of the device so as to produce a surface discontinuity on a first surface 80, similar to that of the hydrofoil device 10 of FIG. 1. The second protrusion 72 produces a surface discontinuity on a second surface 82 of the device. The function of the discontinuity on the second surface 82 is to define a separation point 84 that will remain constant across a wide range of inflow angles. As the flow moves over the second surface 82 of the hydrofoil the discontinuity at or near the leading edge 74 will cause the flow to separate. The angle θ at which the flow separates can be controlled by selecting the tangent line on the surface of the protrusion 72 at the discontinuity. With judicial selection of the tangent at this point, the cavity shape can be defined to cover the trailing edge of the hydrofoil device 70 as shown in FIG. 8(b).

In the region behind the discontinuity formed by the second protrusion 72, an air source is preferably made available so as to prevent reattachment of the separated flow on the second surface 82. Preferably the same air source made available to the base vented trailing edge 78 is employed. By separating the flow the friction across the second surface 82 is thereby reduced and the possibility of cavitation is prevented with the admission of air. The purpose of the discontinuity on the second surface 82 is to encourage a clean separation and stable flow conditions, thereby avoiding buffeting.

Prior to the addition of the discontinuity on the second surface 82 the local pressure on the upper surface may have been at a pressure less than atmospheric. However, the addition of the upper surface discontinuity may reduce the lift force generated due to the upper surface being mostly ventilated at atmospheric pressure. This loss of lift is however offset by the reduced friction over the upper surface and the stability of lift. At very high inflow velocities the upper surface discontinuity may become essential to prevent cavitation and instability.

The principle advantage of this arrangement over conventional hydrofoils is that the speed of the flow over the section is no longer constrained by the onset of cavitation. Sufficient flow speed past the section should be maintained so as to ensure separation occurs. Beyond this speed, the presence of air inhibits cavitation and stable flow conditions exist.

Fully cavitating hydrofoil sections have been designed for high speed applications previously. In general a relatively high inflow angle and high flow speed are required to maintain a stable vapour cavity over the entire surface of the foil. Such high inflow angles severely compromise the efficiency of the hydrofoil and the requirement for a high minimum speed limit application.

By generating a separated region from a discontinuity and the admission of air, the present invention allows a relatively thin section to be used with minimal angle of incidence to the flow. This results in a profound reduction in drag and an increase in the efficiency of the present invention over previously designed cavitating hydrofoils.

However, the present invention may also be applied to hydrofoil sections designed for fully cavitating conditions.

Figure 9A:
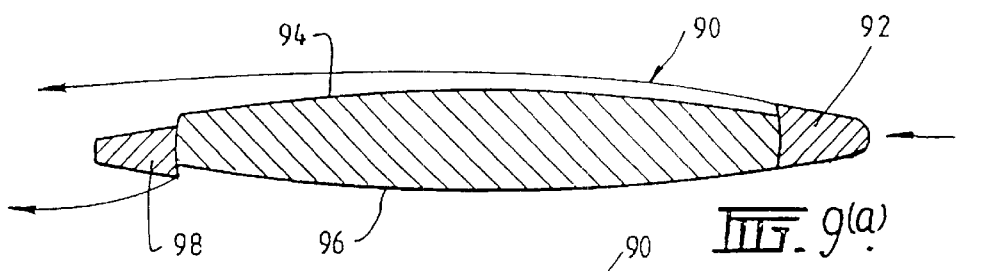
FIGS. 9(a) (b) and (c) illustrate a fourth embodiment of a hydrofoil device according to the present invention.
Figure 9B:
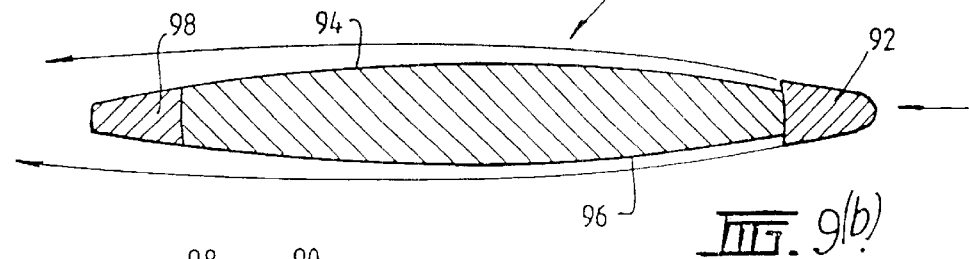
Figure 9C:
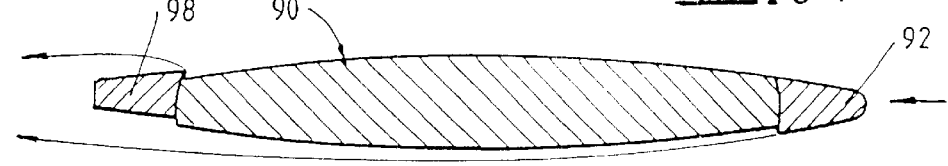

The benefits of a leading edge discontinuity may also be applied to hydrofoils designed for lift in two directions as shown in FIG. 9. FIG. 9 illustrates a forth embodiment of a hydrofoil device 90 in accordance with the invention, in which the second protrusion 92 is adjustable between a first position in which a leading edge surface discontinuity is provided on a second surface 94 of the device, and a second position in which a leading edge surface discontinuity is formed on a first surface 96 of the device. The first and second positions of the second protrusion 92 are illustrated in FIGS. 9(a) and 9(c) respectively. In this embodiment, the second protrusion 92 is formed by a leading edge portion of the hydrofoil device 90 which is moveable between the first and second positions. The leading edge portion 92 of the hydrofoil ahead of the upper surface discontinuity can be arranged to move in the opposite direction to the trailing edge section 98 of the hydrofoil as shown in FIGS. 9(a) and 9(c). Mechanisms for moving the leading edge portion 92 of the hydrofoil may be similar to those employed in moving the aft portion 98. The two moveable portions of the hydrofoil device 90 may also be mechanically connected.

One advantage of this arrangement is that in the mid-travel position as shown in FIG. 9(b), both surfaces 94 and 96 of the hydrofoil benefit from the reduced friction afforded by the air cavity. As mentioned in relation to FIG. 8, the tangent at the separation point should be defined so as to generate a cavity that encapsulates the entire aft portion of the hydrofoil. The depth of the discontinuity to the main body of the hydrofoil device may be increased or decreased to provide additional cavity volume to overcome any cavity oscillations as a result of oscillations in inflow. The arrangement of the leading edge discontinuity ensures that the air supply is maintained adjacent the leading edge at all times. This arrangement is particularly suited for controlled surfaces such as rudders.

In adopting such an arrangement care should be exercised so as to not induce a pocket of cavitation near the leading edge of the section during the neutral stage between generating lift in one direction and the other. A circumstance may arise in high velocity applications, where the air source contained in the base vented cavity cannot reach the leading edge due to a region of attached flow and a pocket of cavitation may exist ahead of the attached flow region. This circumstance may be overcome, albeit at a lesser efficiency, by continually maintaining a discontinuity on both sides of the foil near the leading edge and hence a ventilated cavity on both sides of the foil. If a significant aft disturbance depth is provided on the lower side of the foil, the region of high pressure resulting will suppress the ventilation and lift will result.

In applying the present invention to a propeller significant gains may be achieved over conventional propellers. For a conventional ship's propeller the local blade velocities are limited so as not to cavitate the fluid. Considering the finite thickness limit for blade strength, the practical limit for a non-cavitating blade is typically in the region 25–35 metres per second.

The local blade velocity comprises a component due to inflow into the propeller disk area and a velocity component due to propeller rotation. As the inflow velocity to the propeller disk increases, the velocity component due to propeller rotation must be reduced to maintain cavitation free flow over the blade. To prevent cavitation it therefore becomes necessary to increase the pitch of the blade to effectively reduce the inflow angle. In doing so the lift of the foil contributes progressively less to the thrust of the vessel and more to the torque of the propeller, resulting in diminishing efficiency.

Because it is not limited by the onset of cavitation, the present invention allows a significantly higher rotational speed of the propeller to be maintained, thereby increasing the component of lift acting in the direction of required thrust. The relatively thin section and its alignment closer to the rotation of the propeller reduce torque and/or provide greater efficiency. Furthermore the higher rotational speed reduces the torque requirement for the design of the mechanical components and shafting to transmit a set amount of power. Shock loading as a result of intermittent cavitation is also avoided.

The higher rotation speed of the propeller also serves to reduce the induced drag. Induced drag is the component of drag resulting from the formation of lift. Further reduction in induced drag can be achieved by effectively increasing the aspect ratio of the propeller blade geometrically or by use of endplates or wing tips.

The higher rotational speed allows a higher momentum exchange to occur with the passing fluid and hence a higher disk loading; or a smaller propeller to be utilised for the same power. This is particularly beneficial where high power is to be transmitted or restricted propeller disk space is available.

By making the height of the disturbance adjustable the benefits of a controlled pitch propeller can be achieved with less structural limitations than full blade incidence control, as a significant portion of the blade can be rigidly attached to the hub. The hub would need to be vented to provide the necessary air source for the effective operation of the invention. An added advantage is that this arrangement allows the use of relatively stronger blade section shapes to be adopted than can be used for fully wetted conventional blades. This is due to the non-critical shape, both inside the cavity and aft of the lower perturbation. Furthermore the surface finish required using this arrangement is less critical to performance than for conventional propellers operating close to the cavitation limit.

A further advantage of the improved hydrofoil is that the rearward location of the over pressure region created by the perturbation and the stable air cavity on the upper surface minimises the sensitivity of the section lift to changes in inflow angle and influences of the free surface. This phenomenon makes the section particularly useful for application on lifting hydrofoils operating near the free surface or propellers where the pressure face of a propeller blade operates in close proximity to the ventilated cavity of the preceding blade.

For a conventional hydrofoil where lift is generated primarily from a reduction in pressure over the upper surface of the foil there exists a danger in the hydrofoil drawing air from the free surface into the low pressure region resulting in loss of lift. As the upper surface of the improved hydrofoil is already ventilated there is no danger of unwanted lift loss. In fact the device can operate effectively in generating upward lift with the entire upper surface above the water (planing condition).

For a conventional hydrofoil the reduction in pressure over the upper surface is most significant near the leading edge of the section. Small changes in inflow angle resulting from the orbital velocities of waves can result in changes in inflow angle to the foil and may generate large unwanted force variations. The improved hydrofoil minimises this influence by biasing the lift centre aft away from the leading edge.

Figure 10A:
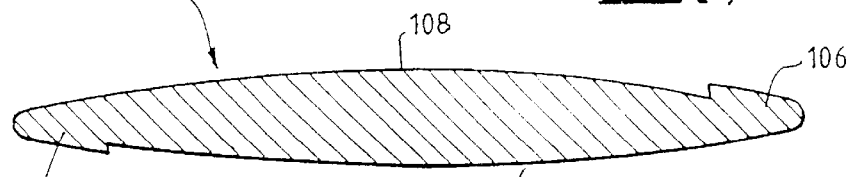
FIGS. 10(a), (b) and (c) illustrate a fifth embodiment of a hydrofoil device according to the present invention.
Figure 10B:
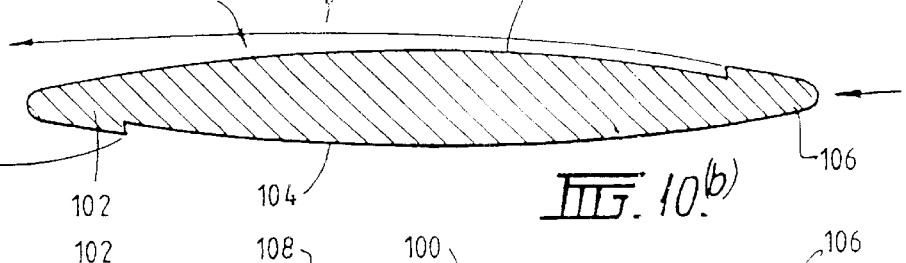
Figure 10C:
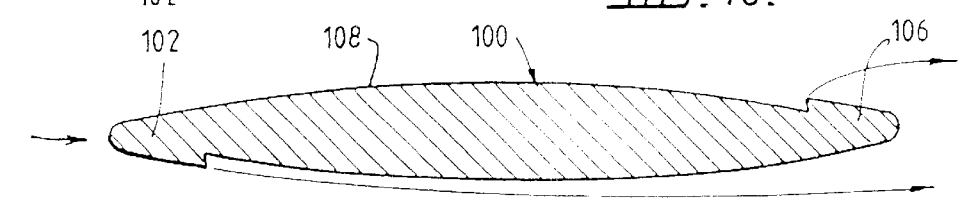

FIG. 10 illustrates a fifth embodiment of the improved hydrofoil device. In this embodiment, the shape of the hydrofoil section is made similar at both the leading and trailing edges to enable the same hydrofoil to generate lift upwards and downwards depending on the direction of the inflow. As shown in the hydrofoil device 100 of FIG. 10, if the first protrusion 102 on the first surface 104 is made the same shape as the second protrusion 106 on the second surface 108, the hydrofoil can be used to generate downward lift if the direction of flow is reversed as illustrated in FIGS. 10(b) and 10(c) respectively. This arrangement is of particular significance in the application to propellers, where until now the hydrofoil sections used were only designed for flow in one direction. When the direction of flow is reversed, by reversing the direction of propeller rotation, the performance with a conventional propeller was severely compromised. With the improved hydrofoil section applied to the propeller blades, it is possible to generate similar performance with propeller rotation in either direction. When applied to propeller blades, the depth of the protrusions 102, 106 can be used to fine tune the propeller loading to that of the propulsion system. If the propeller is manufactured with a generous height of the protrusion on the lower side of the blades, material can be progressively removed until the propeller is matched to the propulsion system.

Figure 11A:
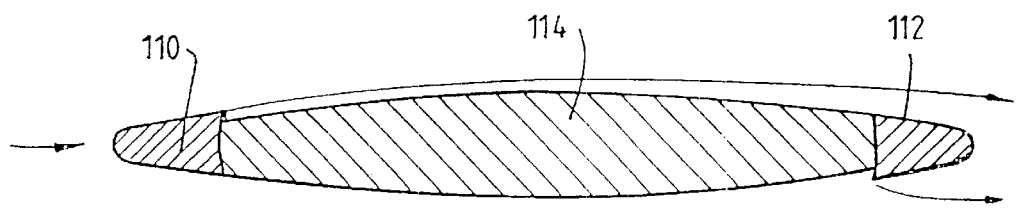
FIGS. 11(a), (b) and (c) illustrate a variation of the hydrofoil device of FIG. 10.
Figure 11B:
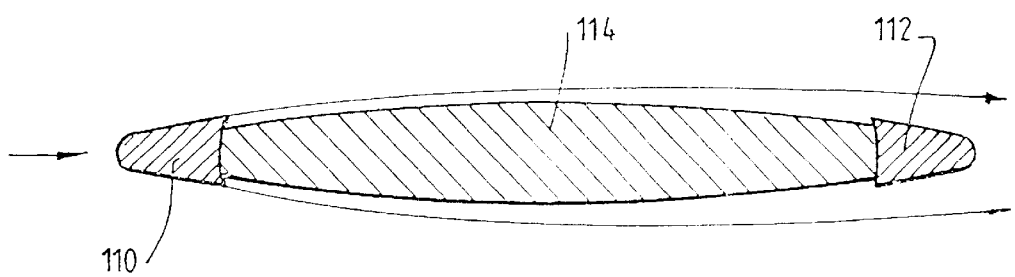
Figure 11C:
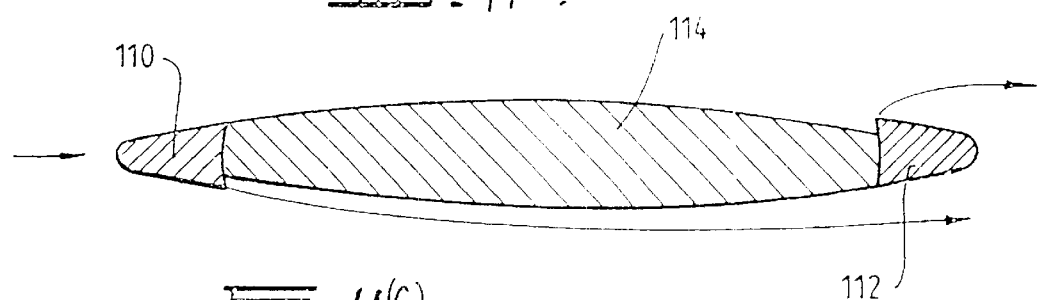

It is also possible to arrange the improved hydrofoil of FIG. 10 in a manner that allows lift to be generated in two directions with two possible inflow directions. In the embodiment of FIG. 11, the two edge sections 110,112 are pivotally mounted at each end of a main body 114 of the hydrofoil section. Each of the edge sections 110,112 can be biased to be proud of either the upper or lower surface. Furthermore, the lift generated in either direction can be controlled by varying the height of the protrusion. As with the two-way lifting hydrofoil described in FIG. 9, care should be exercised to ensure that air supply is available to both leading edge discontinuities. The tangent point of the surface at the leading edge discontinuity should also be defined to ensure that the cavity encapsulates the moveable portion of the hydrofoil at what is now the rear portion of the foil.

Figure 12:
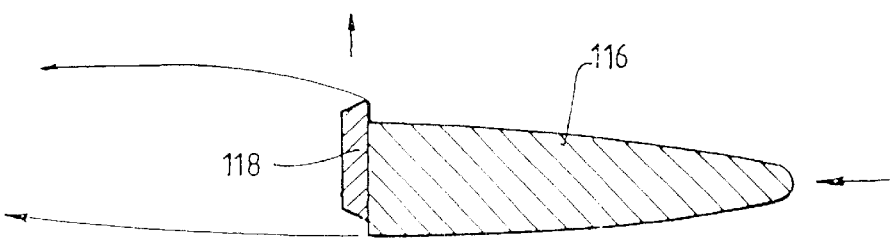
FIG. 12 illustrates a sixth embodiment of the hydrofoil device according to the present invention.

An associated application of the present invention relates to the use of a base vented section 116 with an adjustable perturbation 118 on the base of the section as shown in FIG. 12. In this embodiment the discontinuity near the leading edge is omitted and a diverging section adopted to maintain a positive pressure gradient on both sides of the section, thereby preventing both cavitation and ventilation. An air source is provided at the rear of the section and the rear perturbation 118 is used to vary both the side of the section on which lift is generated and the magnitude of the lift.

It is envisaged that such a section would be ideally suited for use in struts connecting elements adopting the basic form of the invention, operating below the water surface, with structure above or near the water surface. Such a strut section would benefit from increased section strength properties needed to support lift generating surfaces. Furthermore the large base vented cavity would serve to provide an adequate air supply path to sub-surface elements. An example of such an application is a surface piercing strut for a submerged vented hydrofoil section with the strut combining the function of a rudder, air supply path and structural support. A similar arrangement may be employed in the application of Z drive propulsion where the invention is employed for propeller blades.

Now that several embodiments of the improved hydrofoil device according to the present invention have been described in detail, it will be apparent that it has significant advantages over conventional hydrofoils. In particular, by shifting the emphasis of force generation from the low pressure side to the high pressure side of the hydrofoil, the present invention is able to overcome many of the limitations of conventional non-cavitating and fully cavitating hydrofoils. The improved hydrofoil device of the invention may be used for the generation of dynamic force, be it for dynamic support, propulsion, direction control, or indeed any application where conventional or cavitating hydrofoil sections are employed. This would include pumps, water turbines, rudders, control fins and thrusters operating in any fluid medium. The device is particularly suited to those applications where cavitation may otherwise limit performance and a range of inflow velocities are anticipated.

Numerous variations and modifications will suggest themselves to persons skilled in the naval architectural arts, in addition to those already described, without departing from the basis inventive concepts. For example, in each of the described embodiments the hydrofoil section is of similar shape. However, the improved hydrofoil device according to the invention may be of any suitable shape depending on the particular application. All such variations and modifications are to be considered within the scope of the present invention, the nature of which is to be determined from the foregoing description and the appended claims.

What is claimed is:

1. An improved hydrofoil device, the hydrofoil device comprising:
   a first surface and a second surface located on an opposite side of the device to said first surface, wherein water flows over the first and second surfaces from a leading edge to a trailing edge of the device; and
   a protrusion provided adjacent the trailing edge of the device so as to produce a surface discontinuity on said first surface, wherein said protrusion comprises a protrusion surface facing the upstream direction of the hydrofoil, and the protrusion surface defines an included angle to the upstream direction of the hydrofoil of less than or substantially equal to 90°, whereby, in use, water flowing over the first surface is deflected back on itself by the protrusion, and a resulting increase in the local pressure on said first surface upstream of said protrusion contributes substantially to the lift generated by the hydrofoil device.

2. An improved hydrofoil device as defined in claim 1, wherein said moveable surface can be made to protrude from either one of said first surface or said second surface so as to change the direction of lift generated by the hydrofoil device.

3. An improved hydrofoil device as defined in claim 2, further comprising means for ventilating a separated cavity formed adjacent a trailing edge of the device bounded by the water flowing over said first and second surfaces.

4. The improved hydrofoil device as defined in claim 1, further comprising means for ventilating a separated cavity formed adjacent a trailing edge of the device bounded by the water flowing over said first and second surfaces.

5. An improved hydrofoil device as defined in claim 1, wherein said adjustable interceptor is formed by a trailing edge section of the hydrofoil device, said trailing edge section being pivotally mounted on a main body of the device by means of one or more pivot plates.

6. An improved hydrofoil device as defined in claim 5, wherein each said pivot plate extends outwards to a maximum depth of said protrusion and extends upstream at least twice this distance.

7. An improved hydrofoil device as defined in claim 6, wherein each said pivot plate is pivotally coupled to the interior of said main body by a pivot pin.

8. An improved hydrofoil device as defined in claim 7, wherein each said pivot plate is pivotally coupled to said main body by a pivot pin.

9. An improved hydrofoil device as defined in claim 1, wherein said adjustable interceptor is formed by a moveable section slidably mounted in guides so as to be moveable in a direction substantially perpendicular to the direction of flow of water around said hydrofoil device.

10. An improved hydrofoil device as defined in claim 9, wherein said guides are formed by guide plates fixed to a main body of the device and adapted to minimise spilling of the localised high pressure region across said first surface.

11. An improved hydrofoil device as defined in claim 1, further comprising a second protrusion provided adjacent the leading edge of the device so as to produce a surface discontinuity on said second surface whereby, in use, a resulting flow separation defined on said second surface reduces friction and contributes substantially to stable flow conditions across said second surface.

12. An improved hydrofoil device as defined in claim 1, further comprising a second protrusion provided adjacent the leading edge of the device so as to produce a surface discontinuity on said second surface which faces towards the downstream direction of the hydrofoil, whereby, in use, a resulting flow separation defined on said second surface reduces friction and contributes substantially to stable flow conditions across said second surface.

13. An improved hydrofoil device as defined in claim 12, wherein said second protrusion is adjustable between a first position in which a leading edge surface discontinuity is formed on said second surface and a second position on which a leading edge surface discontinuity is formed on said first surface.

14. An improved hydrofoil device as defined in claim 13, wherein said second protrusion is formed by a leading edge portion of the hydrofoil device which is moveable between said first and second positions.

15. The improved hydrofoil device as defined in claim 12, wherein the cross-sectional shape of the hydrofoil device adjacent the leading edge the hydrofoil device is substantially the same as the cross-sectional shape of the hydrofoil device adjacent the trailing edge of the hydrofoil device, the arrangement-being such that when the direction of travel reverses, the flow conditions remain substantially the same and the direction of lift reverses.

16. An improved propeller for marine propulsion, the propeller having a plurality of hydrofoil blades, and at least one of the hydrofoil blades comprising:
- a first surface and a second surface located on an opposite side of the blade to said first surface, wherein water flows over the first and second surfaces from a leading edge to a trailing edge of the blade; and,
- a protrusion provided adjacent the trailing edge of the blade so as to produce a surface discontinuity on said first surface and wherein said protrusion is arranged with an included angle to the upstream direction of the blade of less than or equal to 90° whereby, in use, as the flow of water over the surface is deflected back on itself, a resulting increase in the local pressure on said first surface ahead of said protrusion contributes substantially to the thrust generated by the propeller.

17. An improved propeller as defined in claim 16, further comprising a second protrusion provided adjacent the leading edge of the blade so as to produce a surface discontinuity on said second surface whereby, in use, a resulting flow separation defined on said second surface reduces friction and contributes substantially to stable flow conditions across said second surface.

18. An improved propeller as defined in claim 17, wherein means for ventilating the second surface behind said second protrusion are provided so as to prevent reattachment of the separated flow and inhibit the possibility of cavitation on said second surface.

19. An improved propeller for marine propulsion, the propeller having a plurality of hydrofoil blades, and at least one of the hydrofoil blades comprising:
- a first surface and a second surface located on an opposite side of the blade to said first surface, wherein water flows over the first and second surfaces from a leading edge to a trailing edge of the blade; and,
- a protrusion provided adjacent the trailing edge of the blade so as to produce a surface discontinuity on said first surface, wherein said protrusion comprises a protrusion surface facing the upstream direction of the blade, and the protrusion surface defines an included angle to the upstream direction of the blade of less than or substantially equal to 90° whereby, in use, as the flow of water over the first surface is deflected back on itself by the protrusion, and a resulting increase in the local pressure on said first surface ahead of said protrusion contributes substantially to the thrust generated by the propeller.

20. An improved propeller as defined in claim 19, wherein said moveable surface is formed on a slidable plate which is supported in guide slots oriented in a main body of the blade so that actuation from a hub of the propeller of said slidable plate is orthogonal to the direction of the blade movement.

21. An improved hydrofoil device, the hydrofoil device comprising:
- a first surface and a second surface located on an opposite side of the device to said first surface, wherein water flows over the first and second surfaces from a leading edge to a trailing edge of the device;
- a protrusion provided adjacent the trailing edge of the device so as to produce a surface discontinuity on said first surface;
- wherein said protrusion is arranged with an included angle to the upstream direction of the hydrofoil of less than or substantially equal to 90° whereby, in use, the flow of water over the first surface is deflected back on itself by the protrusion, and a resulting increase in the local pressure on said first surface ahead of said protrusion contributes substantially to the lift generated by the hydrofoil device;
- wherein said protrusion is provided by means of an adjustable interceptor, said interceptor having a moveable surface forming said included angle, whereby, in use, the extent to which said moveable surface protrudes from said first surface can be varied to control the degree of lift generated by the hydrofoil device; and
- wherein said adjustable interceptor is formed by a trailing edge section of the hydrofoil device, said trailing edge section being pivotally mounted on a main body of the device by means of one or more pivot plates.

22. An improved hydrofoil device, the hydrofoil device comprising:
- a first surface and a second surface located on an opposite side of the device to said first surface, wherein water flows over the first and second surfaces from a leading edge to a trailing edge of the device;
- a protrusion provided adjacent the trailing edge of the device so as to produce a surface discontinuity on said first surface;
- wherein said protrusion is arranged with an included angle to the upstream direction of the hydrofoil of less than or substantially equal to 90° whereby, in use, the flow of water over the first surface is deflected back on itself by the protrusion, and a resulting increase in the local pressure on said first surface ahead of said protrusion contributes substantially to the lift generated by the hydrofoil device;
- wherein said protrusion is provided by means of an adjustable interceptor, said interceptor having a moveable surface forming said included angle whereby, in use, the extent to which said moveable surface protrudes form said first surface can be varied to control the degree of lift generated by the hydrofoil device;
- wherein said adjustable interceptor is formed by a moveable section slidably mounted in guides so as to be moveable in a direction substantially perpendicular to the direction of flow of water around said hydrofoil device; and
- wherein said guides are formed by guide plates fixed to a main body of the device and adapted to minimize spilling of the localized high pressure region across said first surface.

23. An improved propeller for marine propulsion, the propeller having a plurality of hydrofoil blades, and at least one of the hydrofoil blades comprising:
- a first surface and a second surface located on an opposite side of the blade to said first surface, wherein water flows over the first and second surfaces from a leading edge to a trailing edge of the blade;
- a protrusion provided adjacent the trailing edge of the blade so as to produce a surface discontinuity on said first surface and wherein said protrusion is arranged with an included angle to the upstream direction of the blade of less than or substantially equal to 90°, whereby, in use, as the flow of water over the surface is deflected back on itself, a resulting increase in the local pressure on said first surface ahead of said protrusion contributes substantially to the thrust generated by the propeller;

wherein said protrusion is provided by means of an adjustable interceptor, said interceptor having a moveable surface forming an included angle to the upstream direction of the blade whereby, in use, the extent to which said moveable surface protrudes from said first surface can be varied to control the thrust generated by the propeller; and wherein said moveable surface is formed on a slidable plate which is supported in guide slots oriented in a main body of the blade so that actuation from a hub of the propeller of said slidable plate is orthogonal to the direction of the blade movement.

24. An improved hydrofoil device, the hydrofoil device comprising:

a first surface and a second surface located on an opposite side of the device to said first surface, wherein water flows over the first and second surfaces from a leading edge to a trailing edge of the device;

a protrusion provided adjacent the trailing edge of the device so as to produce a surface discontinuity on said first surface whereby, in use, a resulting increase in the local pressure on said first surface ahead of said protrusion contributes substantially to the lift generated by the hydrofoil device;

said protrusion is arranged with an included angle to the upstream direction of the hydrofoil of less than or equal to 90° whereby, in use, the flow of water over the surface is deflected back on itself;

wherein said protrusion is provided by means of an adjustable interceptor, said interceptor having a moveable surface forming said included angle whereby, in use, the extent to which said moveable surface protrudes from said first surface can be varied to control the degree of lift generated by the hydrofoil device;

wherein said moveable surface can be made to protrude from either one of said first surface or said second surface so as to change the direction of lift generated by the hydrofoil device; and further comprising means for ventilating a separated cavity formed adjacent a trailing edge of the device bounded by the water flowing over said first and second surfaces, wherein said means for ventilating comprises a flow path for air from atmosphere whereby, in use, air will be drawn into the cavity by natural ventilation.

25. An improved hydrofoil device, the hydrofoil device comprising:

a first surface and a second surface located on an opposite side of the device to said first surface, wherein water flows over the first and second surfaces from a leading edge to a trailing edge of the device;

a protrusion provided adjacent the trailing edge of the device so as to produce a surface discontinuity on said first surface whereby, in use, a resulting increase in the local pressure on said first surface ahead of said protrusion contributes substantially to the lift generated by the hydrofoil device;

said protrusion is arranged with an included angle to the upstream direction of the hydrofoil of less than or equal to 90° whereby, in use, the flow of water over the surface is deflected back on itself;

wherein said protrusion is provided by means of an adjustable interceptor, said interceptor having a moveable surface forming said included angle whereby, in use, the extent to which said moveable surface protrudes from said first surface can be varied to control the degree of lift generated by the hydrofoil device; and wherein said adjustable interceptor is formed by a trailing edge section of the hydrofoil device, said trailing edge section being pivotally mounted on a main body of the device by means of one or more pivot plates.

26. An improved hydrofoil device, the hydrofoil device comprising:

a first surface and a second surface located on an opposite side of the device to said first surface, wherein water flows over the first and second surfaces from a leading edge to a trailing edge of the device;

a protrusion provided adjacent the trailing edge of the device so as to produce a surface discontinuity on said first surface whereby, in use, a resulting increase in the local pressure on said first surface ahead of said protrusion contributes substantially to the lift generated by the hydrofoil device;

said protrusion is arranged with an included angle to the upstream direction of the hydrofoil of less than or equal to 90° whereby, in use, the flow of water over the surface is deflected back on itself;

wherein said protrusion is provided by means of an adjustable interceptor, said interceptor having a moveable surface forming said included angle whereby, in use, the extent to which said moveable surface protrudes from said first surface can be varied to control the degree of lift generated by the hydrofoil device; and wherein said adjustable interceptor is formed by a moveable section slidably mounted in guides so as to be moveable in a direction substantially perpendicular to the direction of flow of water around said hydrofoil device.

27. An improved propeller for marine propulsion, the propeller having a plurality of hydrofoil blades, and at least one of the hydrofoil blades comprising:

a first surface and a second surface located on an opposite side of the blade to said first surface, wherein water flows over the first and second surfaces from a leading edge to a trailing edge of the blade;

a protrusion provided adjacent the trailing edge of the blade so as to produce a surface discontinuity on said first surface, whereby in use, a resulting increase in the local pressure on said first surface ahead of said protrusion contributes substantially to the thrust generated by the propeller; and wherein said protrusion is provided by means of an adjustable interceptor, said interceptor having a moveable surface forming an included angle to the upstream direction of the blade whereby, in use, the extent to which said moveable surface protrudes from said first surface can be varied to control the thrust generated by the propeller.

* * * * *